United States Patent
Baloniak (10) Patent No.: US 12,130,160 B2
(45) Date of Patent: Oct. 29, 2024

(54) METHOD FOR VERIFYING A USEFUL SIGNAL COMPONENT OF A PERIODIC SENSOR SIGNAL

(71) Applicant: KROHNE Messtechnik GmbH, Duisburg (DE)

(72) Inventor: Tim Baloniak, Herne (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 1229 days.

(21) Appl. No.: 16/558,481

(22) Filed: Sep. 3, 2019

(65) Prior Publication Data

US 2020/0072646 A1    Mar. 5, 2020

(30) Foreign Application Priority Data

Sep. 3, 2018    (DE) .................... 10 2018 121 449.9

(51) Int. Cl.
*G01F 1/325*    (2022.01)

(52) U.S. Cl.
CPC ........ *G01F 1/3287* (2022.01); *G06F 2218/08* (2023.01)

(58) Field of Classification Search
CPC ............... G01F 1/8436; G06F 2218/08; G06F 2218/02–20
See application file for complete search history.

(56) References Cited

U.S. PATENT DOCUMENTS 6,386,046 B1    5/2002  Mattar
6,631,281 B1 *  10/2003 Kastle .................. G06F 17/148
                                                              600/323

(Continued)

FOREIGN PATENT DOCUMENTS

DE       10321003 B4        5/2008
JP      2008249331 A    *  10/2008

(Continued)

OTHER PUBLICATIONS

Xu et al., "Frequency-feature based antistrong-disturbance signal processing method and system for vortex flowmeter with single sensor" Review of Scientific Instruments 81, 075104, 2010 (Year: 2010).*

(Continued)

*Primary Examiner* — John C Kuan
(74) *Attorney, Agent, or Firm* — Calderon Safran & Wright P.C.; David S. Safran (57) ABSTRACT

A method for verifying a periodic useful signal component of a sensor signal of a flowmeter. To distinguish a useful signal from a noise signal, a periodic measured variable is detected over a period, and a periodic sensor signal is output, the sensor signal is subjected to a time/frequency analysis, and a time-dependent frequency spectrum of the sensor signal is determined, the time-dependent frequency spectrum is examined for a characteristic feature of the useful signal, and if the expected characteristic feature is found in the time-dependent frequency spectrum, the portion of the sensor signal having the characteristic feature is verified as the useful signal component and a flow measured value is determined on the basis of the verified useful signal component, or if the expected characteristic feature is not found, the portion of the sensor signal which does not have the characteristic feature is rejected as the noise signal component.

13 Claims, 11 Drawing Sheets

(56) References Cited

U.S. PATENT DOCUMENTS

| | | | |
|---|---|---|---|
| 7,010,459 B2 | 3/2006 | Eryurek et al. | |
| 2004/0024568 A1 | 2/2004 | Eryurek et al. | |
| 2013/0317379 A1 | 11/2013 | Brimer et al. | |
| 2017/0274641 A1* | 9/2017 | Pagnon | G01N 11/08 |
| 2017/0328751 A1 | 11/2017 | Lemke | |
| 2018/0106650 A1* | 4/2018 | Pedersen | G01F 15/068 |

FOREIGN PATENT DOCUMENTS

| | | |
|---|---|---|
| WO | 2009068090 A1 | 6/2009 |
| WO | 2013177300 A1 | 11/2013 |

OTHER PUBLICATIONS

Venugopal et al., "Review on vortex flowmeter—Designer perspective" Sensors and Actuators A 170 (2011) 8-23 (Year: 2011).*
Ukil et al., "Harmonic Analysis-based Diagnostics of Noflow Pulsation in Vortex and Swirl Flowmeter" Digital Signal Processing Jul. 2009 (Year: 2009).*

* cited by examiner

METHOD FOR VERIFYING A USEFUL SIGNAL COMPONENT OF A PERIODIC SENSOR SIGNAL

BACKGROUND OF THE INVENTION

Field of the Invention

The invention concerns a procedure for verifying a useful signal component of a periodic sensor signal of a flowmeter, wherein the useful signal component of the sensor signal is used to determine a flow measured value of a flowing medium.

Description of Related Art

A number of flowmeters are known from the state of the art, which determine a value for the flow of a flowing medium on the basis of various operating principles. A common feature of all flowmeters is that a measured variable is recorded by a sensor and corresponding sensor signals are output by the sensor.

A vortex flow measurement, for example, is based on a frequency measurement. A bluff body is introduced into the flowing medium and the frequency of the detaching vortex is determined. For this, a pressure sensor records the pressure fluctuations (measured variable) caused by vortices detached from the bluff body. The sensor signal output by the pressure sensor is subjected to a frequency evaluation. Other periodic sensor signals are also available, for example, with electromagnetic flowmeters (with corresponding periodic excitation) and with Coriolis mass flowmeters.

In addition to the useful signal that is actually of interest, noise signals also occur in real systems, which can also be of a periodic nature. The sensor signal output by the sensor therefore has useful signal components and noise signal components. In vortex flow measurement, such noise signals can be caused, for example, by vibrations of the measuring instrument, in particular by vibrations of pumps or valves. However, noise signals can also be caused, for example, by gas bubbles in a flowing liquid medium. The noise signals can cause the flow measurements to be influenced and the specific flow measured value to be falsified. For example, a very strong noise signal can be incorrectly assumed as a useful signal and used as a basis for determining a flow measured value.

SUMMARY OF THE INVENTION

The object of the invention is, thus, to provide a method with which a useful signal can be reliably distinguished from a noise signal.

The method according to the invention is wherein a measured variable is first detected over a period $t_1$ in a detection step and a periodic sensor signal is output. The period $t_1$ should preferably be selected in such a way that several periods of the sensor signal are output. The more periods of the sensor signal output, the more reliable the result of the method is. In one implementation, the period $t_1$ can be selected by a user, wherein the user can refer, in particular, to empirical values over the duration of a signal period for determining the period $t_1$.

In an analysis step following the detection step, the sensor signal is subjected to a time/frequency analysis and a time-dependent frequency spectrum of the sensor signal is determined.

In order to obtain not only information about the frequency components of the signal at a single point in time, the composition of the sensor signal is determined from individual frequencies over time in the method according to the invention. Thus, if the present application refers to a time-dependent frequency spectrum, this means that the amplitude spectrum of the signal is determined at several points in time.

In a preferred implementation, the time-dependent frequency spectrum of the sensor signal is output in the form of a spectrogram or a scaleogram. The spectrogram or scaleogram is used to visualize a time-dependent frequency spectrum of a signal. In order to be able to display both the frequency and the amplitude of a signal over time, the frequency of the signal over time is usually plotted on spectrograms or scaleograms, wherein the amplitude is represented by color coding of the plotted signal.

According to the invention, it has been recognized that periodic useful signals of a measuring device have characteristic features by means of which they can be clearly identified as useful signals and thus distinguished from a noise signal. Accordingly, the method according to the invention further provides that, in an examination step, the time-dependent frequency spectrum is examined for a characteristic feature of the useful signal.

In one implementation, the time-dependent frequency spectrum is examined for several different characteristic features. This implementation is based on the insight that a useful signal can have several characteristic features at the same time. If the frequency spectrum is examined for several of these characteristic features, the reliability of the method according to the invention can be increased.

If the expected characteristic feature is found, the portion of the sensor signal with the characteristic features is verified as the useful signal component in a verification step. Subsequently, a flow measured value is determined on the basis of the portion of the sensor signal verified as the useful signal component. The method according to the invention makes it possible to identify useful signals on the basis of time-dependent effects which are made accessible for analysis on the basis of time-dependent frequency spectra.

The determination of the flow measured value does not have to be based on the entire useful signal component; in particular, the determination of the flow measured value can be carried out on the basis of a part of the useful signal. In particular, the frequency of the amplitude peak of the useful signal with maximum amplitude can be used as a basis for determining the flow measured value with the help of a vortex flowmeter.

If the expected characteristic feature is not found, the portion of the sensor signal that does not have the characteristic feature is discarded as the noise signal component in a rejection step.

In one implementation in which the frequency spectrum is examined for several characteristic features, a portion of the sensor signal is already verified as a useful signal component if it has only one of the expected characteristic features. In this implementation, it is therefore not intended that all expected characteristic features must actually be detectable; rather, finding only one expected characteristic feature is sufficient.

An alternative implementation of the method according to the invention provides that all expected characteristic features must be found before a portion of the sensor signal is verified as a useful signal component. If only one of the expected characteristic features cannot be found, the corresponding part of the sensor signal is discarded as the noise signal component.

A further implementation of the method according to the invention provides that a user can select the number of characteristic features that have to be found in order to verify a portion of a sensor signal as a useful signal component.

In a further implementation of the method according to the invention, it is provided that a user can select the type of characteristic feature to be found on the basis of which a portion of the sensor signal is verified as a useful signal.

The analysis step can be implemented in different ways with the method according to the invention. A particularly preferred implementation provides that the time/frequency analysis is carried out by means of a short-time Fourier transform. In one variation, the time/frequency analysis is carried out by means of a Gabor transform. A Gabor transform is a special short-time Fourier transform in which a Gauss function is used as a window function. If a short-time Fourier transform is used, in particular also a Gabor transform, this is called a spectrogram in connection with the visual representation of the signal.

In an alternative version of the method according to the invention, the time/frequency analysis is carried out by means of a wavelet transform. In a wavelet transform, temporally localized functions are used as a basis, in particular temporally localized wave functions. If a wavelet transform is used as the basis, this is referred to as a scaleogram in connection with the visual representation of the signal.

In a further alternative version of the method according to the invention, the time/frequency analysis is carried out by means of a Hilbert-Huang transform. The advantage of this design is the low time/frequency uncertainty of the transform.

In order to be able to recognize a characteristic feature in a meaningful way, it must first be precisely analyzed in the error-free state. In a preferred version of the method according to the invention, it is provided that a predetermined value for the ratio of the amplitudes of a signal component of a fundamental frequency and a signal component of a higher order in the frequency spectrum is selected as the characteristic feature. In addition or alternatively, a value can also be selected for the ratio of the amplitudes of two signal components of higher order. In order to be able to provide the value for the amplitude ratio or the amplitude ratios, this value must first be determined in the error-free state. If the amplitude ratio then corresponds to the specified value during a flow measurement, the corresponding sensor signal component is verified as the useful signal component.

In a preferred version of the method according to the invention, a specified amplitude modulation and/or a specified frequency modulation of a signal component is selected as the characteristic feature. In a first variation, a signal component is thus verified as a useful signal if it is amplitude modulated in a specified way. In a second variation, a signal component is verified as a useful signal if it is frequency modulated in a specified way. In a third variation, the two characteristic features are combined and a signal component is then verified as a useful signal if it is amplitude modulated in a specified way and frequency modulated in a specified way.

If the time-dependent frequency spectrum has signal components of higher orders, the amplitude and/or frequency modulation can occur additionally or exclusively with signal components of higher orders.

In a further implementation, the occurrence of jitter in the time-dependent frequency spectrum, especially in the spectrogram or scaleogram, is selected as a characteristic feature. If jitter can be found in the frequency spectrum, the corresponding sensor signal component is verified as the useful signal component. Jitter is a deviation from the periodicity of a periodic signal. In a vortex flowmeter, for example, jitter means a temporal variance between the individual vortex separations. In a frequency spectrum, jitter is noticeable by a broadening of the individual amplitude peaks.

In order to be able to reliably identify characteristic features in the frequency spectrum, a further implementation of the method according to the invention is wherein a subsection of the temporal frequency spectrum is selected in a subsection selection step and that this subsection is subjected to a further time/frequency analysis in a subsection analysis step. A subsection can be selected here by a user. A subsection can also be selected on the basis of predefined criteria, for example in such a way that a predefined amplitude value of a signal component is found in the spectrum and then the section around the corresponding signal component is selected as a subsection in which the amplitude value drops to a predefined percentage of the predefined amplitude value.

In a preferred implementation, the subsection is subjected to a further Gabor transform or a further wavelet transform. The choice of transform can depend on the transform used in the analysis step. It is thus provided in one implementation that the same transform is carried out as in the analysis step. In another implementation, a transform different from the transform carried out in the analysis step is carried out.

A particularly preferred implementation of the method according to the invention is not only suitable for verifying a useful signal component of a periodic sensor signal. Rather, the particularly preferred implementation enables long-term diagnosis and thus in particular the detection of changes in the useful signal component. The particularly preferred version is wherein the method is carried out several times in succession, with information about the verified useful signal component being stored after each method cycle. The stored information can, for example, be the determined flow values, or can be information about the characteristic feature(s) found, i.e., a value for an amplitude ratio of two peaks in the frequency spectrum. After each method cycle, a currently verified useful signal component is compared to the useful signal component of the previous method cycle. In particular, the stored information can be compared. In the event of a deviation of the useful signal components from one another beyond a specified tolerance range, a notification is output. The notification can be output in various ways, for example by outputting an optical or an acoustic signal. A notification can also be output by storing the message internally.

In one implementation, the individual method cycles are carried out continuously one after the other. In another implementation, the individual method cycles are carried out at intervals of a specified waiting time T. Here, the waiting time T can be constant or vary between the individual method cycles and, in particular, be selected by a user.

In detail, there are now various possibilities for designing and further developing the method according to the invention for verifying a useful signal component of a periodic sensor signal. Additional aspects, features, advantages, and properties of the present invention follow from the following description of preferred embodiments with reference to the accompanying drawings.

BRIEF DESCRIPTION OF THE DRAWINGS

Figure 1:
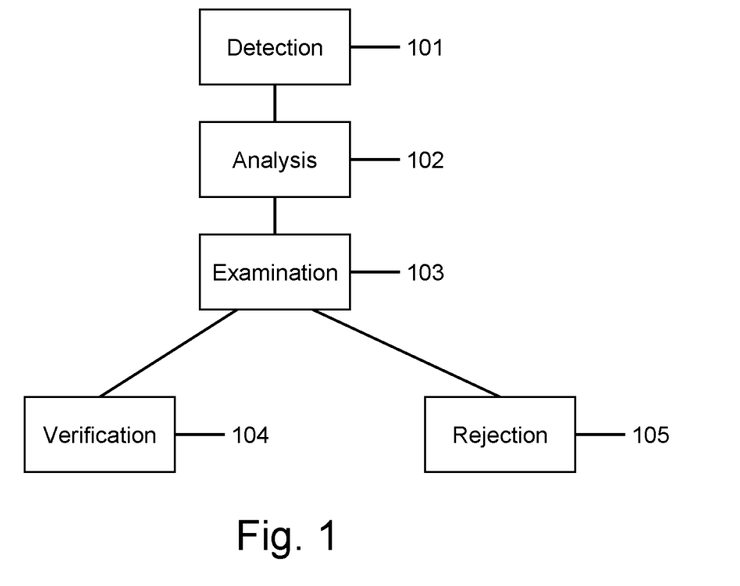
FIG. 1 is a flow chart of a first embodiment of the method according to the invention.

FIG. 1 shows a block diagram of a first embodiment of the method according to the invention for verifying a useful signal component of a periodic sensor signal of a flowmeter. In a detection step 101, a measured variable is detected by a sensor of the flowmeter. The measured variable is detected over a period $t_1$, wherein the period $t_1$ can, for example, be specified by a user. The sensor then outputs a periodic sensor signal. The sensor signal has a useful signal component and a noise signal component. In an analysis step 102, the sensor signal is subjected to a time/frequency analysis. The time/frequency analysis is carried out in the embodiment shown by means of a Garbor transform. Not shown, but also covered by the invention is the carrying out of the time/frequency analysis with any other transform, such as a wavelet transform. After the time/frequency analysis, a time-dependent frequency spectrum of the sensor signal is determined. In an examination step 103, the frequency spectrum is examined for one or more characteristic features of the useful signal. If one or more expected characteristic features is found, the portion of the sensor signal having the characteristic features is verified as the useful signal component in a verification step 104. A determination of the flow measured value can then be carried out on the basis of this portion of the sensor signal verified as the useful signal component. If the expected characteristic feature is not found, or if the expected characteristic feature is not found in the spectrum, the corresponding sensor signal component is discarded as a noise signal component in a rejection step 105.

Figure 2:
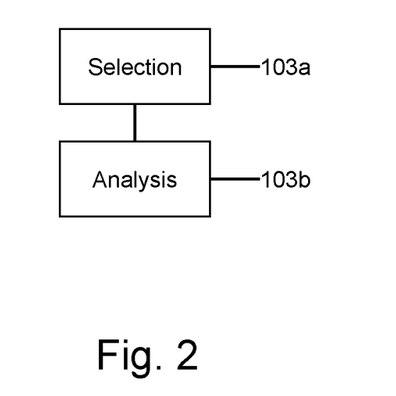
FIG. 2 is a flow chart of an embodiment for finding characteristic features in a spectrum.

FIG. 2 shows a block diagram of an embodiment for finding characteristic signals in the frequency spectrum, i.e., it shows an embodiment of the examination step 103. To find expected characteristic features, a subsection of the time-dependent frequency spectrum is selected in a subsection selection step 103a, which is to be examined more closely. The selection of the subsection can be carried out by a user. In a subsection analysis step 103b, the selected subsection is subjected to a further time/frequency analysis. In the example shown, the further time/frequency analysis is carried out by means of a wavelet transform.

Figure 3:
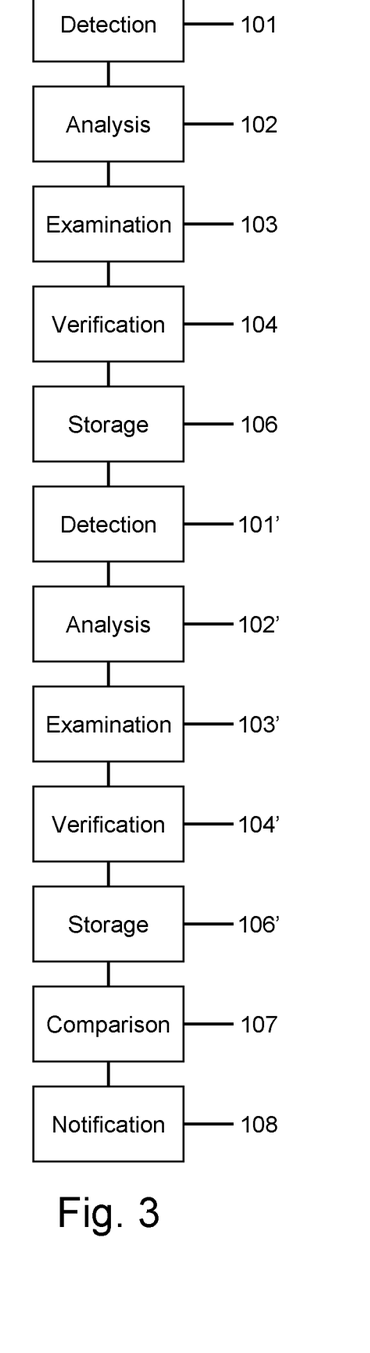
FIG. 3 is a flow chart of a second embodiment of the method according to the invention.

FIG. 3 shows a block diagram of another preferred embodiment of the method for verifying a useful signal component of a periodic sensor signal. The first method steps correspond to the method steps shown in FIG. 1: in a detection step 101, a periodic measured variable is detected over a period $t_1$ and a periodic sensor signal is output from a sensor. In an analysis step 102, the sensor signal is subjected to a time/frequency analysis. After determining a time-dependent frequency spectrum of the sensor signal, the determined frequency spectrum is examined for a characteristic feature of the useful signal in an examination step 103. In a verification step 104, when the expected characteristic feature is found, the portion of the sensor signal with the characteristic feature is verified as the useful signal component and a flow measured value is determined on the basis of the verified useful signal component. Information about the verified useful signal component is then stored in an information storage step 106. The information can, for example, be the characteristic features or can be the flow measured value determined on the basis of the verified useful signal component. The method described in FIG. 3 is now wherein the method described so far is repeated, i.e., the method steps are carried out several times in succession. In a second detection step 101', a measured variable is now detected by a sensor over a further period $t_2$ and a periodic sensor signal is output. In a second analysis step 102', the sensor signal is subjected to a time/frequency analysis and a time-dependent frequency spectrum of the sensor signal is determined. In a second examination step 103', the frequency spectrum is examined for a characteristic feature. Here the characteristic feature corresponds to the characteristic feature already sought in the first method cycle. When the expected characteristic feature is found, the sensor signal component with the characteristic feature is verified as the useful signal component in a second verification step 104' and a further flow measured value is determined on the basis of the second verified useful signal component. In a second information storage step 106', the same information concerning the useful signal component is stored as in the first method cycle. In a subsequent comparison step 107, the useful signal component of the second method cycle is compared to the useful signal component of the first method cycle. The comparison is made on the basis of the stored information of the respective useful signal components. If the useful signal components deviate from one another beyond a specified tolerance range, a corresponding notification is output in a notification step 108. The embodiment of the method thus allows a good possibility for monitoring the flow measurement. In particular, long-term monitoring can be implemented with which changes to the flowmeter can be easily detected.

Figure 4A:
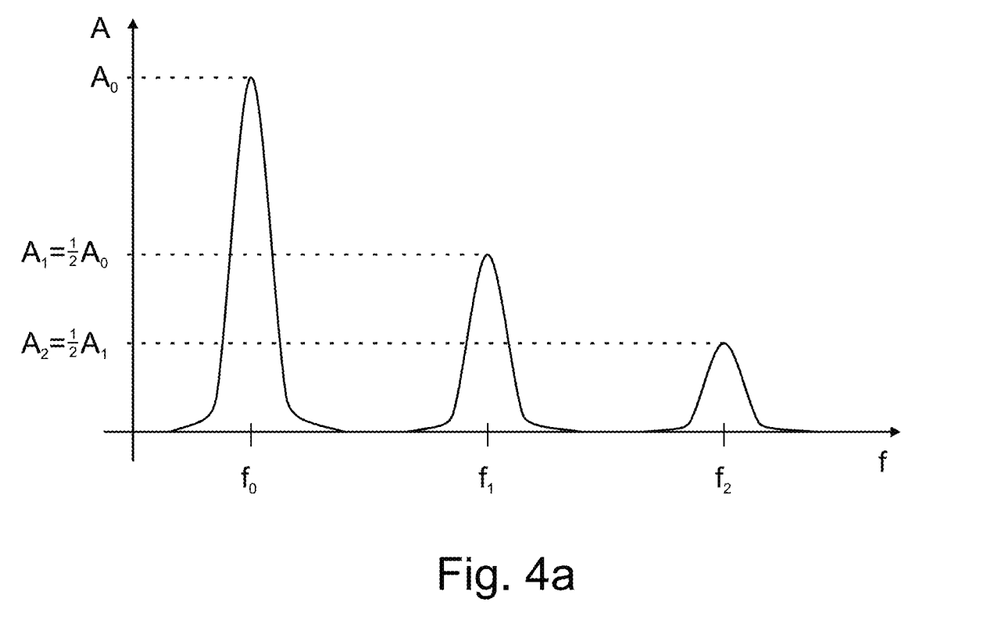
FIG. 4a is a plot of a pure useful signal.

FIG. 4a shows a spectrum of an undisturbed sensor signal at a time t, i.e., a sensor signal which consists only of a useful signal. The useful signal has an amplitude peak at a fundamental frequency $f_0$ with the amplitude $A_0$, a first-order amplitude peak at the frequency $f_1$ with the amplitude $A_1$ and a second-order amplitude peak at the frequency $f_2$ with the amplitude $A_2$. A characteristic feature of the useful signal shown is that the amplitude $A_1$ of the first-order amplitude peak is half as large as the amplitude $A_0$ of the second-order amplitude peak at the fundamental frequency $f_0$ and that the amplitude $A_2$ of the second-order amplitude peak is half as large as the amplitude $A_1$ of the first-order amplitude peak and thus a quarter as large as the amplitude $A_0$ of the amplitude peak at the fundamental frequency $f_0$.

The characteristic feature chosen here is that the value for the ratio of the amplitudes of the amplitude peak of order O and the amplitude peak of order (O+1) is one half.

Figure 4B:
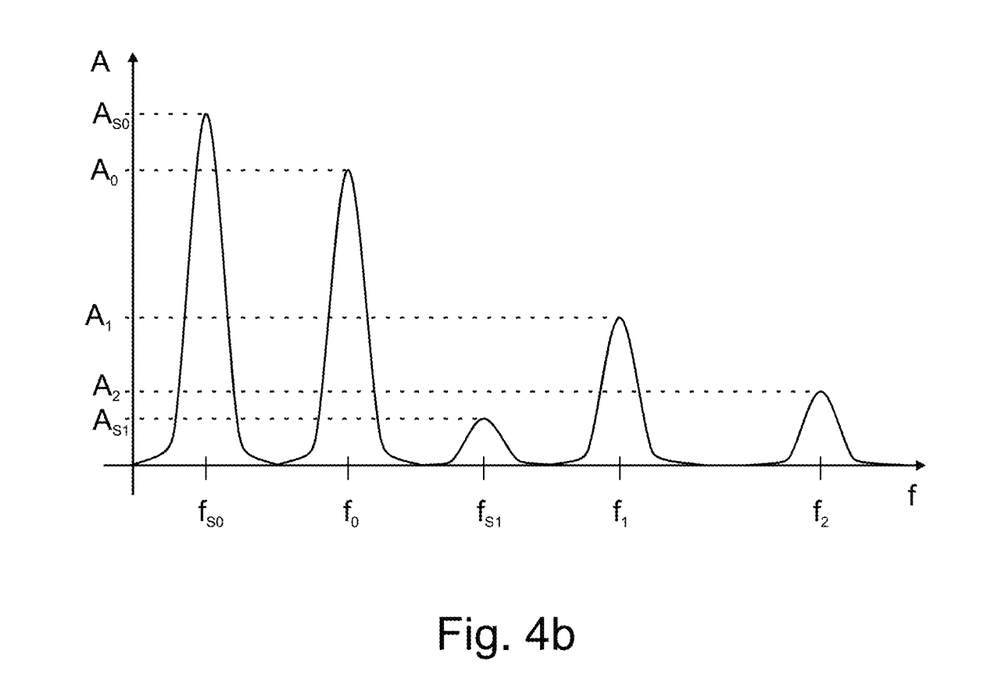
FIG. 4b is a plot of a sensor signal with a useful signal component and a noise signal component.

FIG. 4b shows a spectrum at a time t of a sensor signal, which in addition to a useful signal component also has a noise signal component. The useful signal component corresponds to the useful signal shown in FIG. 4a. The noise signal component consists of an additional amplitude peak at the frequency $f_{s0}$ with the amplitude $A_{s0}$ and an additional amplitude peak at the frequency $f_{s1}$ with the amplitude $A_{s1}$. The noise signal component can be identified as the noise signal component in that the amplitude ratio $A_{s1}/A_{s0}$ of the amplitude peaks at the frequencies $f_{s0}$ and $f_{s1}$ is not one half and thus does not exhibit the characteristic feature.

FIGS. 5 to 12 show time-dependent frequency spectra in the form of spectrograms, each of which shows useful signals with different characteristic features.

In FIGS. 5 to 12, the time t is plotted on the x-axis, the frequency f is plotted on the y-axis and the amplitude A is plotted in color-coded form. The corresponding color scale is shown to the right of the spectrogram.

Figure 5:
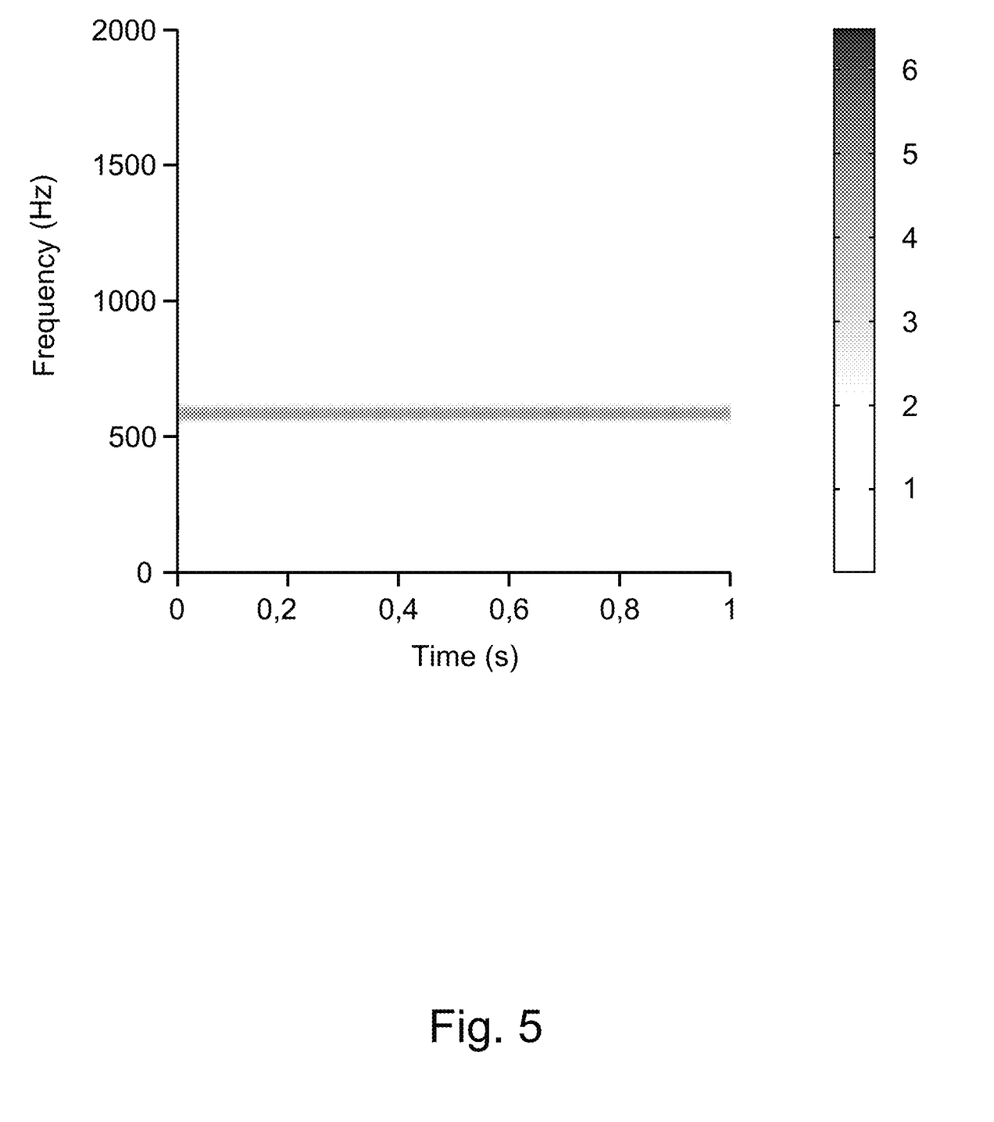
FIG. 5 is a spectrogram of a useful signal stable in frequency and amplitude over time.
Figure 6:
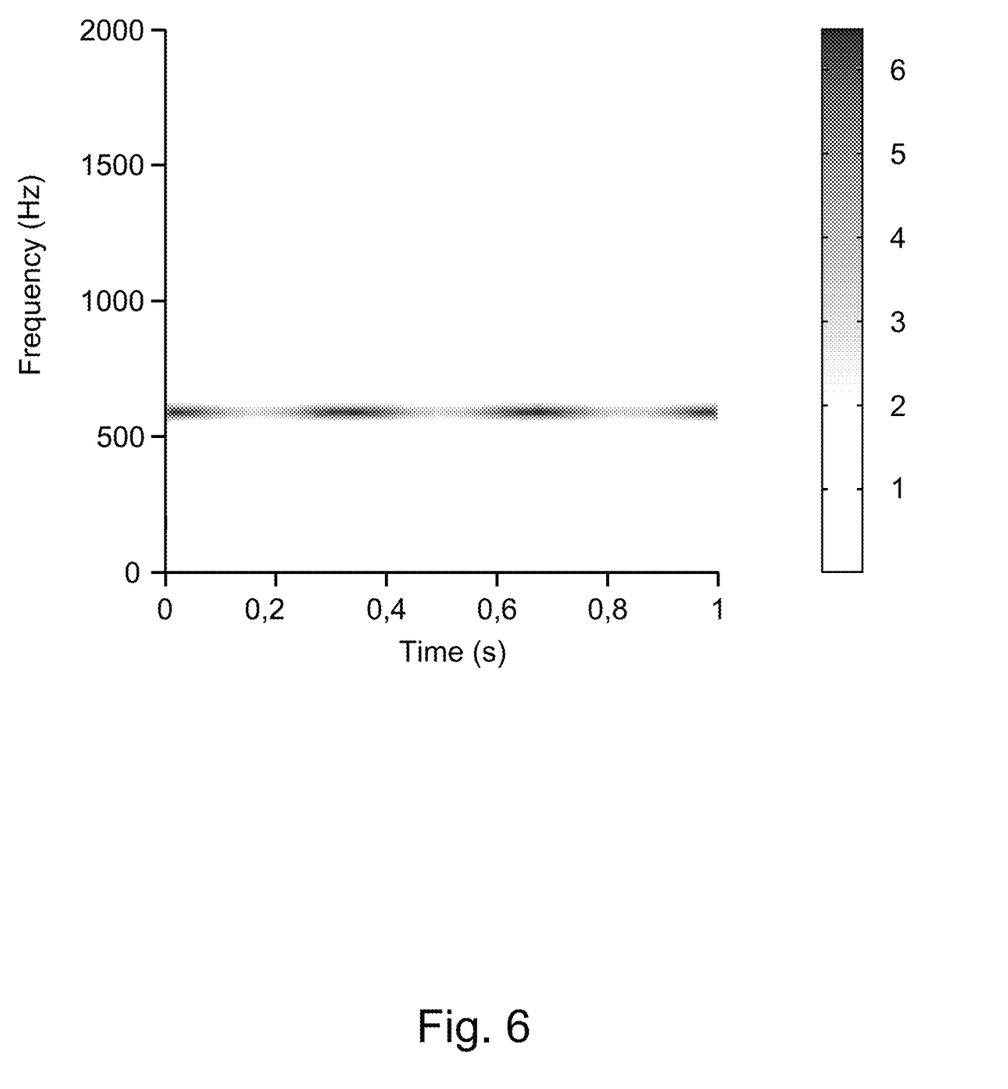
FIG. 6 is a spectrogram of an amplitude-modulated useful signal.

FIG. 5 shows a useful signal stable in frequency and amplitude over time without special characteristic features.

In order for a signal to be verified as a useful signal, it can be provided that the signal has exactly one characteristic feature. For example, this can be a certain amplitude modulation or a certain frequency modulation. The useful signal shown in FIG. 6 has an amplitude modulation that corresponds to the amplitude modulation defined as a characteristic feature.

Figure 7:
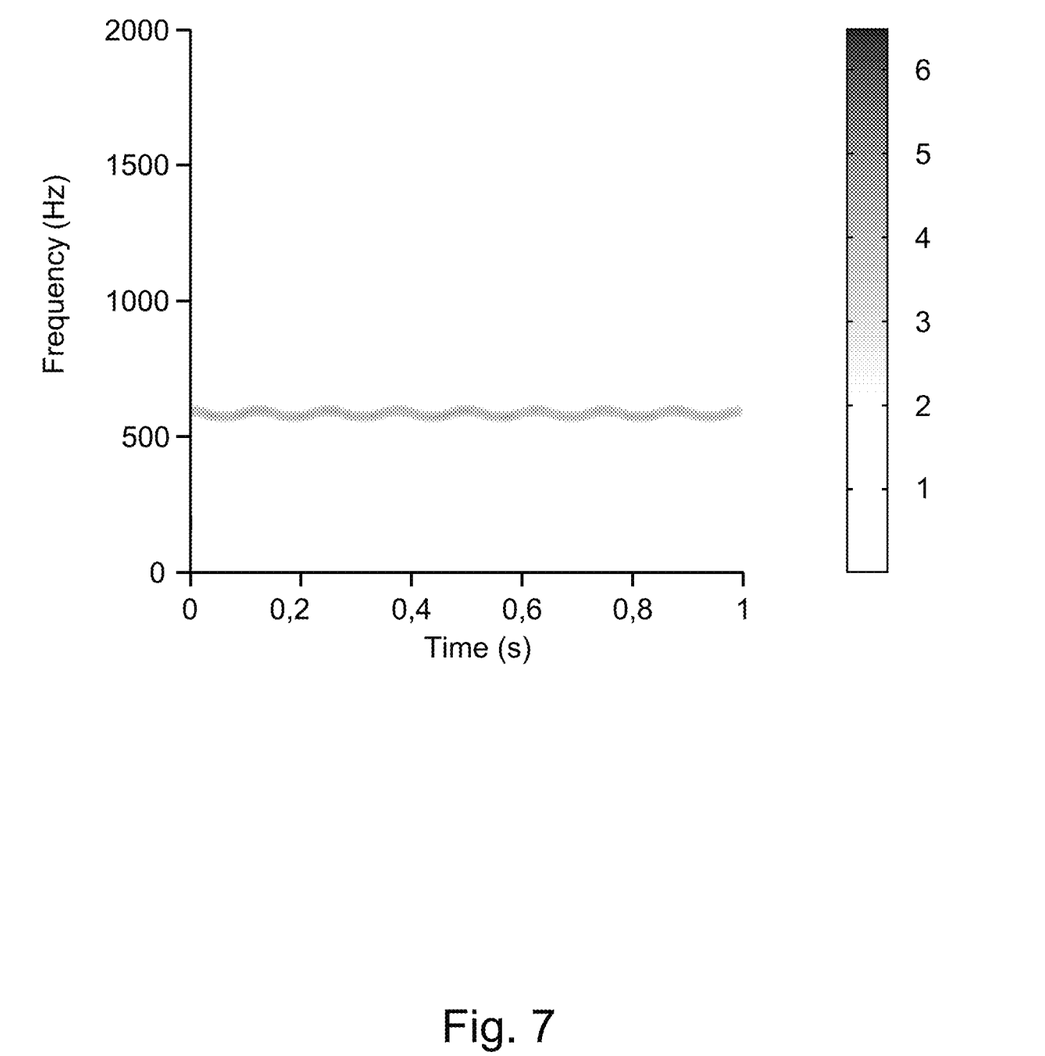
FIG. 7 is a spectrogram of a frequency-modulated useful signal.
Figure 8:
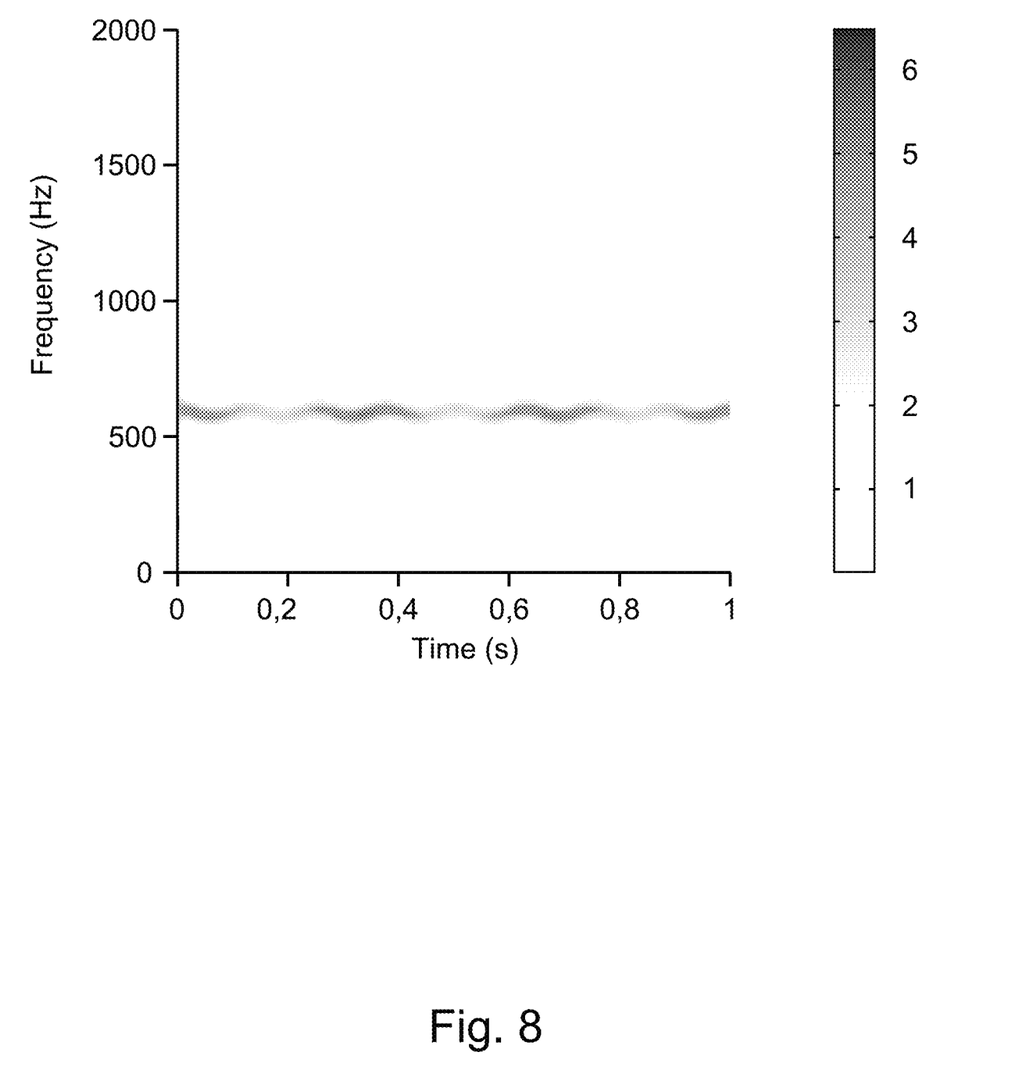
FIG. 8 is a spectrogram of a useful signal modulated by both amplitude and frequency.

The useful signal shown in FIG. 7 is frequency modulated in a characteristic manner. Thus, if a signal has the corresponding frequency modulation, it is verified as a useful signal.

In order for a signal to be verified as a useful signal, it can also be provided that it has several characteristic features, for example, that it is amplitude modulated in a certain way and frequency modulated in a certain way. If the signal has only one of the two characteristic features, it is not verified as a useful signal but rejected as a noise signal. The useful signal shown in FIG. 8 has two characteristic features: On the one hand, it has an amplitude modulation defined as a characteristic feature, on the other hand, it also has a frequency modulation defined as a characteristic feature.

Figure 9:
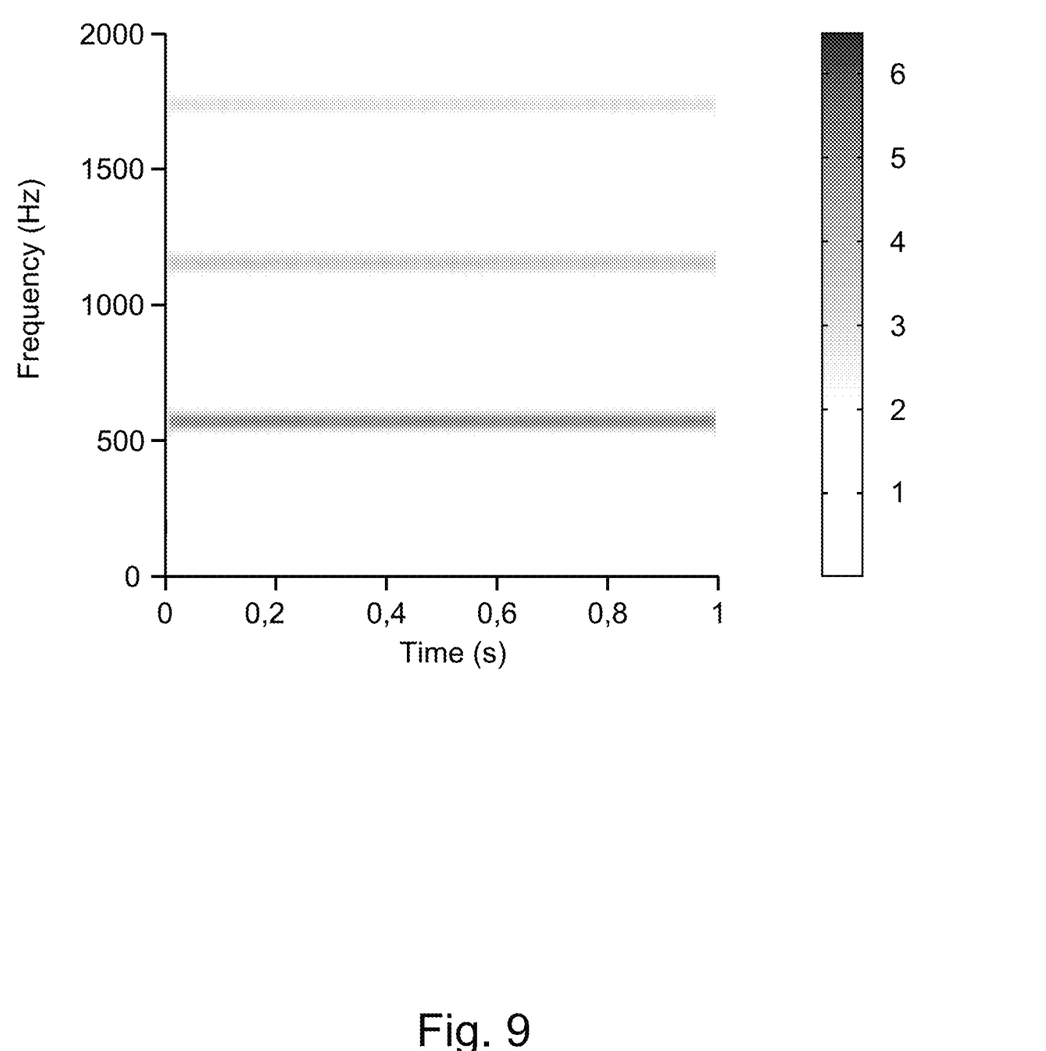
FIG. 9 is a spectrogram of a useful signal with harmonics.

FIG. 9, like FIG. 4a, shows a useful signal with a signal component at a fundamental frequency $f_0$ with the amplitude $A_0$, a signal component of the first order at the frequency $f_1$ with the amplitude $A_1$ and a signal component of the second order at the frequency $f_2$ with the amplitude $A_2$. In contrast to FIG. 4a, however, not only one time point t is shown, but rather the entire spectrogram with its temporal course. It is characteristic of the useful signal shown that the amplitude $A_1$ of the first-order amplitude peak is in a certain ratio to the amplitude $A_0$ of the second-order amplitude peak at the fundamental frequency $f_0$ and that the amplitude $A_2$ of the second-order amplitude peak is in a certain ratio to the amplitude $A_1$ of the first-order amplitude peak. The characteristic feature selected here is a certain value for the ratio of the amplitudes of the amplitude peak of order O and the amplitude peak of order (O+1).

Figure 10:
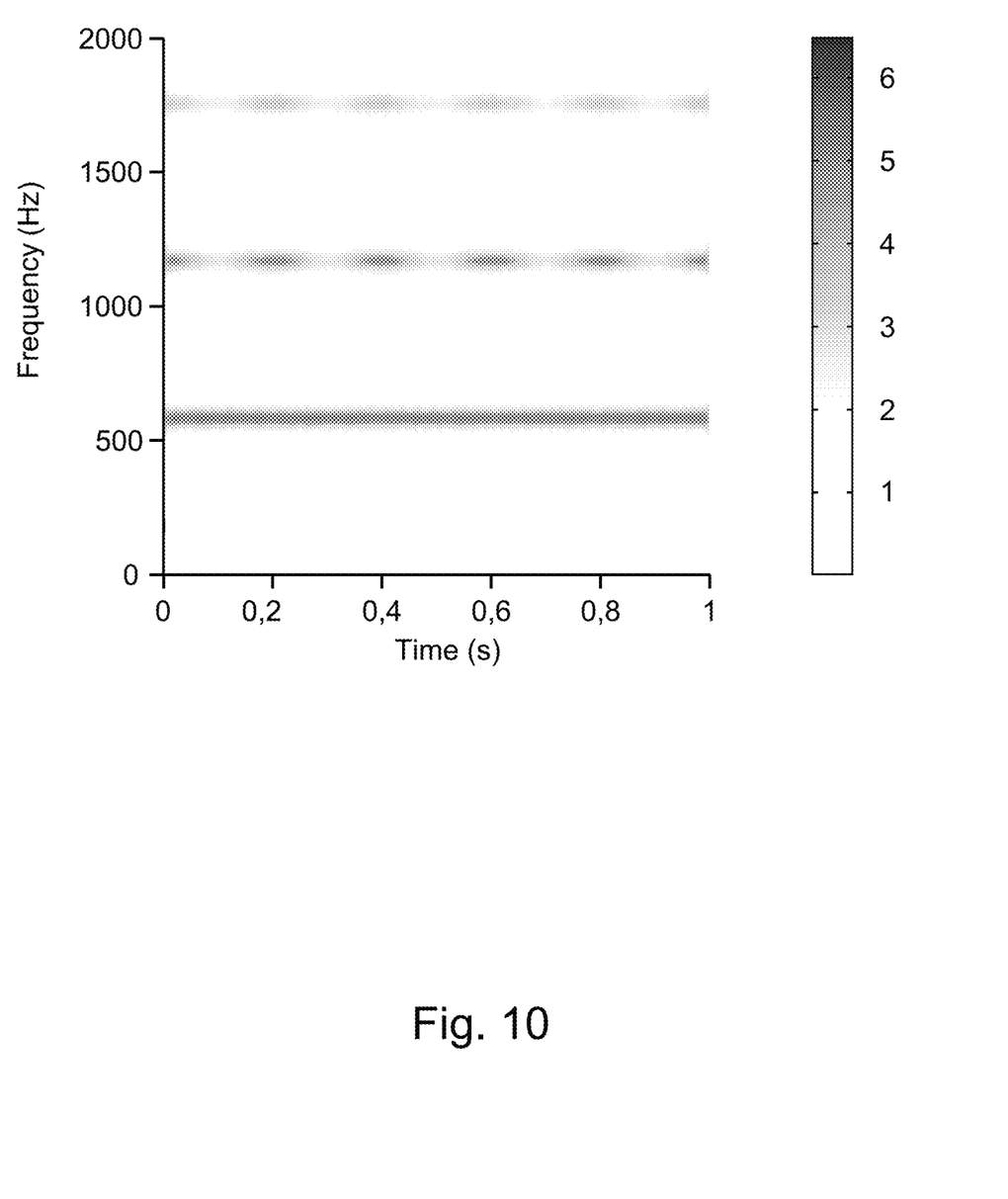
FIG. 10 is a spectrogram of a useful signal with amplitude-modulated harmonics.

The spectrogram shown in FIG. 10 shows the characteristic feature of the amplitude modulation of the harmonics in addition to the characteristic feature already shown in FIG. 9. A signal is thus verified as a useful signal if, in addition to the given amplitude ratios of the signal components of the various orders, it also has the characteristic amplitude modulation.

Figure 11:
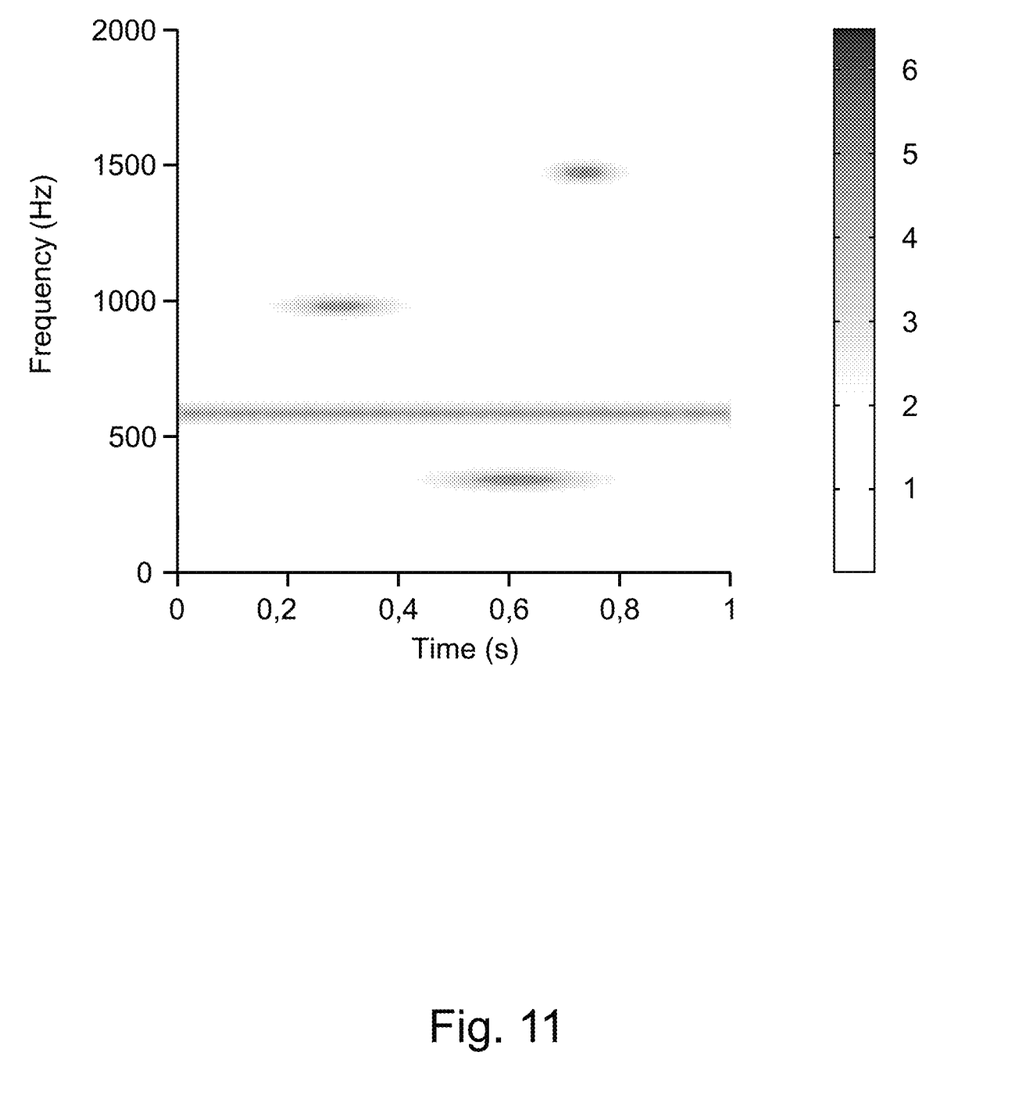
FIG. 11 is a spectrogram of a useful signal with temporally limited noise signal components and FIG. 12 is a spectrogram of a useful signal at a flow pulse.

FIG. 11 shows the useful signal shown in FIG. 5 with constant amplitude and constant frequency, wherein the spectrogram shown in FIG. 11 also shows temporally limited noise signal components. The temporally limited noise signals can, for example, result from gas bubbles occurring in the medium if the spectrogram is based on a vortex flow measurement.

Figure 12:
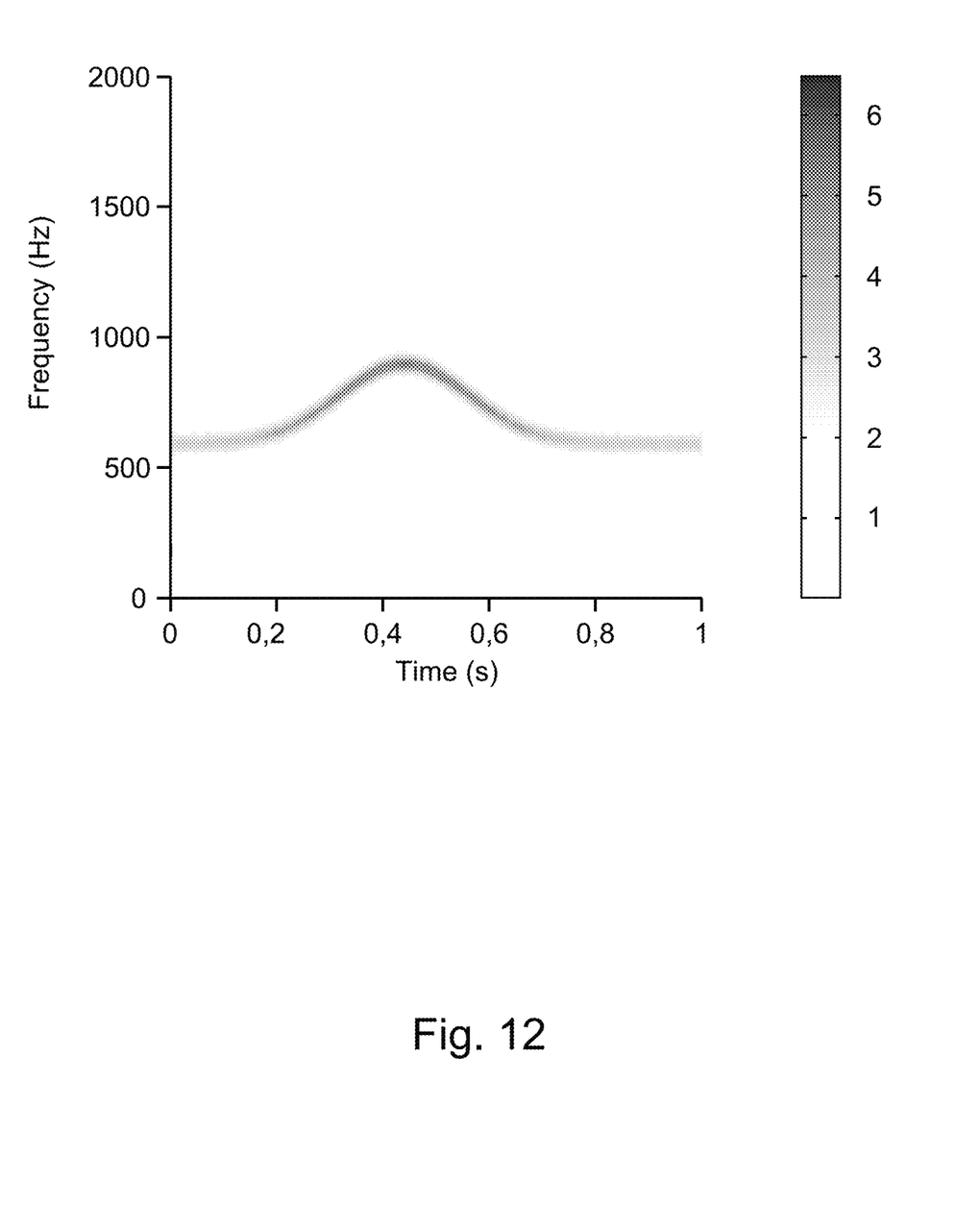

FIG. 12 shows another spectrogram showing a useful signal at a flow pulse. The frequency and amplitude of the signal are characteristically linked.

What is claimed is:

1. A method for verifying a periodic useful signal component of a sensor signal of a flowmeter, wherein the flowmeter comprises one of a vortex flowmeter, an electromagnetic flowmeter, or a Coriolis mass flowmeter, and wherein the useful signal component of the sensor signal is used to determine a flow measured value of a flowing medium, comprising engaging the flowmeter to generate the sensor signal and a method cycle of:
  a detection step of detecting a periodic measured variable over a period $t_1$, and outputting a periodic sensor signal based on the detected periodic measured variable,
  an analysis step of subjecting the sensor signal to a time/frequency analysis, and determining a time-dependent frequency spectrum of the sensor signal, wherein the time-dependent frequency spectrum of the sensor signal contains information about both a frequency and an amplitude of the sensor signal over time,
  an examination step of examining the time-dependent frequency spectrum for an expected characteristic feature which is characteristic of a useful signal, and one of:
    a verification step of verifying a portion of the sensor signal having the characteristic feature as the useful signal component if the characteristic feature is found in the time-dependent frequency spectrum and determining a measured flow value of the flowmeter based on the verified useful signal component, or
    a rejection step of rejecting a portion of the sensor signal which does not have the characteristic feature as an interference signal component if the characteristic feature is not found in the time-dependent frequency spectrum,
  the method further comprising selecting a subsection of the time-dependent frequency spectrum in a subsection selection step to identify the characteristic feature, and subjecting the subsection to a further time/frequency analysis in a subsection analysis step.

2. The method according to claim 1, wherein at least one of a predetermined amplitude modulation or a predetermined frequency modulation of a signal component is selected as the characteristic feature.

3. The method according to claim 1, wherein at least one of a) a predetermined value for a ratio of amplitudes of a signal component of a fundamental frequency and a signal component of a higher order in a time-dependent frequency spectrum is selected as the characteristic feature or b) a value for a ratio of amplitudes of two signal components of higher orders is selected as the characteristic feature.

4. The method according to claim 1, wherein a jitter in the time-dependent frequency spectrum is selected as the characteristic feature.

5. The method according to claim 1, further comprising performing a method cycle comprising the detection step, the analysis step, the examination step, and the verification step at least twice chronologically in succession, wherein, after each said method cycle in the succession, information is stored about the portion of the sensor signal verified as a useful signal component, and after a first said method cycle in the succession, after each next said method cycle in the succession, a current, verified useful signal component is compared to the useful signal component of the preceding said method cycle in the succession, and in the event of a deviation of the compared useful signal components from one another beyond a predetermined tolerance range, a notification is output.

6. The method according to claim 1, wherein the time/frequency analysis is carried out by means of a short-time Fourier transform.

7. The method according to claim 1, wherein the time/frequency analysis is carried out by means of a wavelet transform.

8. The method according to claim 1, wherein the time/frequency analysis is carried out by means of a Gabor transform.

9. The method according to claim 1, wherein the time/frequency analysis is carried out by means of a Hilbert-Huang transform.

10. The method according to claim 1, wherein the time-dependent frequency spectrum of the sensor signal contains information about an amplitude spectrum of the sensor signal determined at several points in time.

11. The method according to claim 1, wherein the time-dependent frequency spectrum comprises a spectrogram.

12. The method according to claim 11, wherein the spectrogram visually depicts amplitude of the sensor signal as a function of both frequency and time.

13. The method according to claim 1, wherein the time-dependent frequency spectrum comprises a scaleogram.

* * * * *